United States Patent
Discekici et al.

(10) Patent No.: US 12,251,875 B2
(45) Date of Patent: Mar. 18, 2025

(54) THREE-DIMENSIONAL PRINTING WITH TINTED ANTI-COALESCING AGENTS

(71) Applicant: Hewlett-Packard Development Company, L.P., Spring, TX (US)

(72) Inventors: Emre Hiro Discekici, San Diego, CA (US); Shannon Reuben Woodruff, San Diego, CA (US); Graciela Emma Negri Jimenez, San Diego, CA (US); Jacob Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 445 days.

(21) Appl. No.: 17/637,473

(22) PCT Filed: Oct. 22, 2019

(86) PCT No.: PCT/US2019/057325
§ 371 (c)(1),
(2) Date: Feb. 23, 2022

(87) PCT Pub. No.: WO2021/080565
PCT Pub. Date: Apr. 29, 2021

(65) Prior Publication Data
US 2022/0274327 A1 Sep. 1, 2022

(51) Int. Cl.
*B29C 64/165* (2017.01)
*B29C 64/295* (2017.01)
(Continued)

(52) U.S. Cl.
CPC .......... *B29C 64/165* (2017.08); *B29C 64/295* (2017.08); *B29K 2077/00* (2013.01);
(Continued)

(58) Field of Classification Search
CPC .................................................. B29C 64/165
See application file for complete search history.

(56) References Cited

U.S. PATENT DOCUMENTS

| 5,416,145 A | 5/1995 | Askeland et al. |
| 2001/0050031 A1* | 12/2001 | Bredt ..................... B33Y 70/10 |
| | | 106/204.01 |

(Continued)

FOREIGN PATENT DOCUMENTS

| WO | 99/64249 A1 | 12/1999 |
| WO | 2019/108200 A1 | 6/2019 |

(Continued)

*Primary Examiner* — S. Behrooz Ghorishi
*Assistant Examiner* — Alexander A Wang
(74) *Attorney, Agent, or Firm* — HP Inc. Patent Department

(57) ABSTRACT

A multi-fluid kits for three-dimensional printing can include a fusing agent and a tinted anti-coalescing agent. The fusing agent can include water and an electromagnetic radiation absorber that absorbs radiation energy and converts the radiation energy to heat. The tinted anti-coalescing agent can include an aqueous liquid vehicle, a colored dye dissolved in the aqueous liquid vehicle, and a polyelectrolyte. The polyelectrolyte can have a weight average molecular weight from about 1,000 Mw to about 8,000 Mw, the polyelectrolyte can be water-absorbent at a water to polyelectrolyte weight ratio from about 2:1 to about 1,000:1, and about 90 wt % to 100 wt % of the polyelectrolyte can be dissolved in the aqueous liquid vehicle.

16 Claims, 3 Drawing Sheets

(51) Int. Cl.
    *B29K 77/00*      (2006.01)
    *B29K 101/12*     (2006.01)
    *B29K 105/00*     (2006.01)
    *B33Y 10/00*      (2015.01)
    *B33Y 30/00*      (2015.01)
    *B33Y 70/10*      (2020.01)

(52) U.S. Cl.
    CPC .. *B29K 2101/12* (2013.01); *B29K 2105/0032* (2013.01); *B33Y 10/00* (2014.12); *B33Y 30/00* (2014.12); *B33Y 70/10* (2020.01)

(56) References Cited

U.S. PATENT DOCUMENTS

| | | |
|---|---|---|
| 2005/0059757 A1* | 3/2005 | Bredt .................. B33Y 70/10 106/443 |
| 2005/0197431 A1 | 9/2005 | Bredt et al. |
| 2007/0224345 A1 | 9/2007 | Metz et al. |
| 2011/0076404 A1 | 3/2011 | Brust et al. |
| 2019/0039296 A1 | 2/2019 | Prasad et al. |
| 2019/0047216 A1 | 2/2019 | Emamjomeh et al. |

FOREIGN PATENT DOCUMENTS

| | | |
|---|---|---|
| WO | 2019/108288 A1 | 6/2019 |
| WO | 2019/156656 A1 | 8/2019 |

\* cited by examiner

THREE-DIMENSIONAL PRINTING WITH TINTED ANTI-COALESCING AGENTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. This technology has been somewhat limited with respect to commercial production capabilities because the range of materials used in three-dimensional printing has been likewise limited. Accordingly, it can be difficult to three-dimensional print functional parts with desired properties such as mechanical strength, visual appearance, and so on. Nevertheless, several commercial sectors, such as aviation and the medical industry, have benefitted from the ability to rapidly prototype and customize parts for customers.

DETAILED DESCRIPTION

Figure 1:
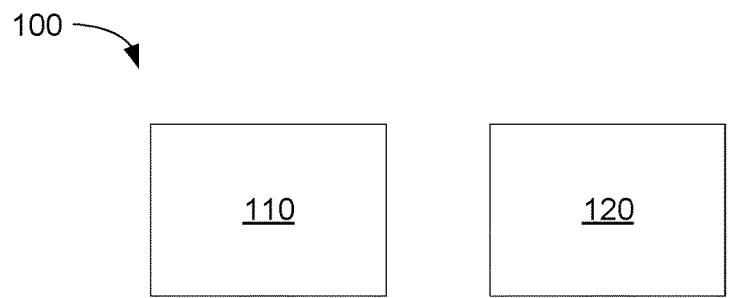
FIG. 1 is a schematic view of an example multi-fluid kit for three-dimensional printing in accordance with examples of the present disclosure.

Multi-fluid kits, three-dimensional printing kits, and methods described herein can be used to make three-dimensional printed objects with increased uniformity of surface color. A tinted anti-coalescing agent can be applied around edges of individual layers of the three-dimensional printed objects and a colored dye in the tinted anti-coalescing agent can color the surface of the object while a polyelectrolyte in the tinted anti-coalescing agent can help to control thermal bleed. In one example, a multi-fluid kit for three-dimensional printing includes a fusing agent and a tinted anti-coalescing agent. The fusing agent includes water and an electromagnetic radiation absorber. The electromagnetic radiation absorber absorbs radiation energy and converts the radiation energy to heat. The tinted anti-coalescing agent includes an aqueous liquid vehicle, a colored dye dissolved in the aqueous liquid vehicle, and a polyelectrolyte having a weight average molecular weight from about 1,000 Mw to about 8,000 Mw. The polyelectrolyte is water-absorbent at a water to polyelectrolyte weight ratio from about 2:1 to about 1,000:1, and about 90 wt % to 100 wt % of the polyelectrolyte is dissolved in the aqueous liquid vehicle. In some examples, the polyelectrolyte can be present in an amount from about 1 wt % to about 12 wt % with respect to the total weight of the tinted anti-coalescing agent. In further examples, the polyelectrolyte can be an anionic linear or branched polyelectrolyte. In certain examples, the polyelectrolyte can include poly(acrylic acid sodium salt), poly(acrylic acid potassium salt), poly(acrylic acid lithium salt, poly(acrylic acid ammonium salt), or a combination thereof. In still further examples, the polyelectrolyte can be a strong polyelectrolyte that is fully dissociated in the aqueous liquid vehicle. In some examples, the colored dye can be a black dye. In certain examples, the colored dye can be present in an amount from about 0.1 wt % to about 3 wt %.

The present disclosure also describes three-dimensional printing kits. In one example, a three-dimensional printing kit includes a powder bed material, a fusing agent, and a tinted anti-coalescing agent. The powder bed material includes polymer particles. The fusing agent includes water and an electromagnetic radiation absorber. The electromagnetic radiation absorber absorbs radiation energy and converts the radiation energy to heat. The tinted anti-coalescing agent includes an aqueous liquid vehicle, a colored dye dissolved in the aqueous liquid vehicle, and a polyelectrolyte having a weight average molecular weight from about 1,000 Mw to about 8,000 Mw. The polyelectrolyte is water-absorbent at a water to polyelectrolyte weight ratio from about 2:1 to about 1,000:1, and about 90 wt % to 100 wt % of the polyelectrolyte is dissolved in the aqueous liquid vehicle. In some examples, the polymer particles can include polyamide 6, polyamide 9, polyamide 11, polyamide 12, polyamide 6/6, polyamide 6/12, polyethylene, thermoplastic polyurethane, polypropylene, polyester, polycarbonate, polyether ketone, polyacrylate, polystyrene powder, wax, or a combination thereof. In certain examples, the polyelectrolyte can be present in an amount from about 1 wt % to about 12 wt % with respect to the total weight of the tinted anti-coalescing agent. In further examples, the colored dye can be a black dye and the black dye can be present in an amount from about 0.1 wt % to about 3 wt % with respect to the total weight of the tinted anti-coalescing agent.

The present disclosure also describes methods of making three-dimensional printed objects. In one example, a method of making a three-dimensional printed object includes iteratively applying individual powder bed material layers of polymer particles to a powder bed. A fusing agent is selectively jetted onto the individual powder bed material layers, based on a 3D object model, at build areas where the three-dimensional printed object is being formed. The fusing agent includes water and an electromagnetic radiation absorber. A tinted anti-coalescing agent is selectively jetted, based on the 3D object model, onto individual powder bed material layers laterally at a border region between a first area where the powder bed material is contacted by the fusing agent and a second area where the powder bed material is not contacted by the fusing agent. The tinted anti-coalescing agent includes an aqueous liquid vehicle, a colored dye dissolved in the aqueous liquid vehicle, and a polyelectrolyte. The powder bed is exposed to energy to selectively fuse the polymer particles in contact with the radiation absorber to form a fused polymer matrix at individual powder bed material layers while at the same time retaining water associated with the polyelectrolyte at the border at a water to polyelectrolyte weight ratio from about 2:1 to about 1,000:1. In some examples, the polyelectrolyte can be an anionic linear or branched polyelectrolyte having a weight average molecular weight from 1,000 Mw to about 8,000 Mw and the polyelectrolyte can be water-absorbent to retain water within the water to polyelectrolyte weight ratio. In certain examples, the polyelectrolyte can include poly(acrylic acid sodium salt), poly(acrylic acid potassium salt), poly(acrylic acid lithium salt, poly(acrylic acid ammonium salt), or a combination thereof. In further examples, the colored dye can be a black dye and the black dye can be present in an amount from about 0.1 wt % to about 3 wt % with respect to the total weight of the tinted anti-coalescing agent.

It is noted that when discussing the multi-fluid kits, three-dimensional printing kits, and methods herein, these discussions can be considered applicable to one another whether or not they are explicitly discussed in the context of that example. Thus, for example, when discussing a fusing agent related to a three-dimensional printing kit, such disclosure is also relevant to and directly supported in the context of multi-fluid kits and methods, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Multi-fluid Kits for Three-dimensional Printing

As mentioned above, in some examples the multi-fluid kits described herein can be used to make three-dimensional printed objects having increased surface color uniformity. The tinted anti-coalescing agent can tint the outer surface of the three-dimensional printed objects. Additionally, the tinted anti-coalescing agent can help reduce thermal bleed during the three-dimensional printing process. Thermal bleed, when not controlled, can compromise printed three-dimensional printed objects made using the multi-jet fusion additive manufacturing processes described herein. For example, as a certain amount of heat is used to achieve fusion of polymer particles of a powder bed material, particularly fusion between layers, combined with the (often) constant heat input to maintain powder bed temperatures, controlling heat dissipation can be complex. Heat from the portion of the polymer bed being fused can bleed into surrounding powder bed material. In some cases, this can cause the surrounding particles of powder bed material to become partially fused or caked onto the surface of the three-dimensional printed object. However, the tinted anti-coalescing agents described herein can include a polyelectrolyte that can dissipate heat at a border region between the three-dimensional printed object and the powder surrounding the printed object in the powder bed.

Additionally, in some examples, three-dimensional printed objects can be made using a fusing agent that includes a black pigment as a radiation absorber. The powder bed material can be white in color, but the black fusing agent can color the fused polymer particles black. However, the surfaces of the three-dimensional printed object can often have a non-uniform color because of polymer particles at the surface that are not fully coated with the black fusing agent. The color may be made more uniform by applying a black coloring agent around the borders of the layers of the three-dimensional printed object. This can cause additional thermal bleed, however, because black colorants can tend to absorb radiation and generate heat. Thus, it has been difficult to make three-dimensional printed objects with uniformly colored surfaces while also controlling thermal bleed. The tinted anti-coalescing agents described herein have been found to be capable of increasing uniformity of the surface color while also controlling thermal bleed.

With this description in mind, FIG. 1 shows a schematic of an example multi-fluid kit 100 for three-dimensional printing. The kit can include a fusing agent 110 and a tinted anti-coalescing agent 120. The fusing agent can include water and an electromagnetic radiation absorber that can absorb radiation energy, e.g., electromagnetic radiation energy, and convert the radiation energy to heat. The tinted anti-coalescing agent can include an aqueous liquid vehicle, a colored dye dissolved in the aqueous liquid vehicle, and a polyelectrolyte. In some examples, the polyelectrolyte can be an anionic linear or branched polyelectrolyte, the polyelectrolyte can have a weight average molecular weight from about 1,000 Mw to about 8,000 Mw, and/or the polyelectrolyte can be water-absorbent to retain water within the water to polyelectrolyte weight ratio. About 90 wt % to 100 wt % of the polyelectrolyte can be dissolved in the aqueous liquid vehicle.

In examples herein, the tinted anti-coalescing agent can include a polyelectrolyte, which can be considered to be an anti-coalescing compound capable of reducing or preventing fusing of polymer particles onto which the tinted anti-coalescing agent is applied. In some examples, the tinted anti-coalescing agent can be printed around the edges of the portion of the powder that is printed with the fusing agent. The tinted anti-coalescing agent can increase selectivity between the fused and unfused portions of the powder bed by reducing the temperature of the powder around the edges of the portion to be fused.

With more specific reference to the polyelectrolyte, this component can be present in the tinted anti-coalescing agent at from about 1 wt % to about 12 wt % based on the total content of the tinted anti-coalescing agent, or can be present at from about 2 wt % to about 10 wt %, or from about 4 wt % to about 8 wt %. The polyelectrolyte can be a strong polyelectrolyte that is fully dissolved in the aqueous liquid vehicle, or substantially fully dissolved, e.g., from about 90 wt % to 100 wt % of the total content of the polyelectrolyte in the tinted anti-coalescing agent is dissolved in the tinted anti-coalescing agent. For example, polyelectrolyte can be a strong polyelectrolyte that is fully dissolved in the aqueous liquid vehicle of the tinted anti-coalescing agent. The polyelectrolyte can be charged, such as anionic or cationic, but in one example, the polyelectrolyte can be an anionic polyelectrolyte. The polyelectrolyte can, for example, be a linear or branched polymer and/or can have a weight average molecular weight from about 1,000 Mw to about 12,000 Mw, from about 1,000 Mw to about 8,000 Mw. In further detail, the polyelectrolyte can be water-absorbent, sometimes referred to as superabsorbent, e.g., absorbent at a water to polyelectrolyte weight ratio from about 2:1 to about 1,000:1, from about 4:1 to about 800:1, or from about 10:1 to about 500:1. In certain more specific examples, the polyelectrolyte can include poly(acrylic acid sodium salt), poly(acrylic acid potassium salt), poly(acrylic acid lithium salt, poly(acrylic acid ammonium salt), or a combination thereof. If the polyelectrolyte includes a poly(acrylic acid sodium salt), for example, the compound may have the structure:

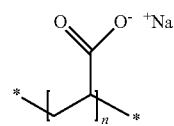

where n can be an integer, along with any capping groups that may be present, that provides a polymer having a weight average molecular weight from about 1,000 Mw to about 12,000 Mw. In a more specific example, n can be from about 10 to about 60, from about 12 to about 52, or from about 16 to about 40, for example.

The tinted anti-coalescing agent can also include a colored dye. The colored dye can impart a color to particles of powder bed material onto which the anti-coalescing agent is applied. In certain examples, the anti-coalescing agent can be applied to powder bed material at or near the borders of the area to be fused. Thus, the polymer particles that are at the edge of the area to be fused can be colored by the colored dye. When the completed three-dimensional printed object is formed, these particles can be located on exterior surfaces of the three-dimensional printed object. Therefore, when the tinted anti-coalescing agent is applied to the powder bed in this way, the colored dye can color the surfaces of the final three-dimensional printed object.

In certain examples, the colored dye can be a black dye. This can be especially useful when the fusing agent used to fuse the polymer particles is black. In further examples, the colored dye can be selected to match the color of the fusing agent, or the color that the polymer particles take on after the fusing agent has been jetted thereon. In further examples, the colored dye in the anti-coalescing agent can be another color other than black. A three-dimensional printed object can be formed having a different color, either by the use of a colored fusing agent or a separate colored agent that is applied during three-dimensional printing. Non-limiting examples of dyes that can be used in the tinted anti-coalescing agent can include the C.I. Direct series of dyes. In certain examples, the colored dye can be a C.I. Direct Black series dye.

In some examples, the colored dye can be dissolved in the tinted anti-coalescing agent. In certain examples, the dye can be soluble in water and/or in the liquid vehicle of the tinted anti-coalescing agent. In further examples, the dye can be soluble up to 3 wt % or more based on the weight of the dissolved dye with respect to the total weight of the tinted anti-coalescing agent. In other examples, the dye can be soluble up to 4 wt % or more or up to 5 wt % or more. The amount of dye included in the tinted anti-coalescing agent can be selected, depending on the strength of coloring desired and on the solubility of the dye. In some examples, the dye can be included at a concentration from about 0.1 wt % to about 3 wt % with respect to the total weight of the tinted anti-coalescent agent. In further examples, the dye can be included in a concentration from about 0.2 wt % to about 2.5 wt % or from 0.5 wt % to about 2 wt %.

In further examples, a weight ratio of the polyelectrolyte to the colored dye can be from about 1:3 to about 100:1, or from about 1:1 to about 20:1, or from about 5:1 to about 15:1. The weight ratio of the polyelectrolyte to colored dye in the tinted anti-coalescing agent can be sufficient so that the polyelectrolyte can help control thermal bleed enough to counteract any additional heating caused by the colored dye.

In some examples, the tinted anti-coalescing agent can be mostly water. In a particular example, the tinted anti-coalescing agent can be about 80 wt % to about 99 wt % water. In further examples, the tinted anti-coalescing agent can be about 85 wt % to 99 wt % water, or about 90 wt % to 99 wt % water.

The tinted anti-coalescing agent can also include ingredients to allow the tinted anti-coalescing agent to be jetted by a fluid jet printhead. In some examples, the tinted anti-coalescing agent can include jettability imparting ingredients such as those in the fusing agent described below. These ingredients can include a liquid vehicle, surfactant, dispersant, co-solvent, biocides, viscosity modifiers, materials for pH adjustment, sequestering agents, preservatives, and so on. These ingredients can be included in any of the amounts described below.

In some examples, the polyelectrolyte can be formulated in the tinted anti-coalescing agent with a detailing compound that can reduce the temperature of powder bed material, such as a solvent that evaporates at the temperature of the powder bed. In certain examples, if used, the detailing compound can be water and/or an organic co-solvent. Non-limiting examples of co-solvents for use in the tinted anti-coalescing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof.

Turning to the fusing agent mentioned above, in some examples the fusing agent can include an electromagnetic radiation absorber that is capable of absorbing electromagnetic radiation to produce heat. The radiation absorber can be colored or colorless. In certain examples, the radiation absorber can have a color that matches the color of the colored dye in the tinted anti-coalescing agent. In a particular example, the tinted anti-coalescing agent can include a black dye, and the radiation absorber in the fusing agent can also be black in color.

In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT: PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used in the fusing agent. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments that can be used in the fusing agent include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber in the fusing agent can include a metal dithiolene complex. Transition metal dithiolene complexes can exhibit a strong absorption band in the 600 nm to 1600 nm region of the electromagnetic spectrum. In some examples, the central metal atom can be any metal that can form square planar complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, like the tinted anti-coalescing agent, the fusing agent can be applied onto the powder bed material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof. In accordance with the present disclosure, since the polyelectrolytes in the tinted anti-coalescing agent have the ability to hold or retain water or other evaporative liquids, e.g., from about 2 to about 1,000 times the weight of the polyelectrolyte compound included in the tinted anti-coalescing agent, there may be higher levels of evaporative cooling than with the same solvents added for evaporative cooling, but which are not held in place by the polyelectrolytes of the present disclosure.

In some examples, the liquid vehicle formulation of the fusing agent and/or the tinted anti-coalescing agent can be water or can be an aqueous liquid vehicle that includes water and a co-solvent or co-solvents present in total at from about 1 wt % to about 50 wt %, depending on the application architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

Classes of co-solvents that can be used in the fusing agent and/or the tinted anti-coalescing agent can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

The fusing agent and/or the tinted anti-coalescing agent can include a surfactant or multiple surfactants such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100, Triton™ X-405 available from Dow Chemical Company (Michigan); and sodium dodecylsulfate.

Various other additives can be used to enhance certain properties of the fusing agent and/or the tinted anti-coalescing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt.

Three-Dimensional Printing Kits

Figure 2:
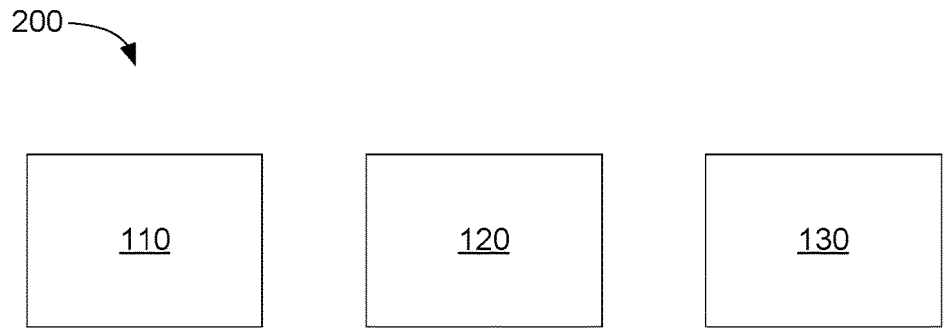
FIG. 2 is a schematic view an example three-dimensional printing kit in accordance with examples of the present disclosure.

The present disclosure also describes three-dimensional printing kits 200, as shown schematically in FIG. 2. In some examples, the three-dimensional printing kits can include materials that can be used in the three-dimensional printing processes described herein. More specifically, the three-dimensional printing kits described herein can include a powder bed material 130 including polymer particles, as well as the fusing agent 110 and the tinted anti-coalescing agent 120 described previously in relation to the multi-fluid kit for three-dimensional printing.

With more specific reference to the powder bed material, this material can include polymer particles having a variety of shapes, such as spherical particles or irregularly-shaped particles. The polymer particles can be present in the powder bed material at from about 60 wt % to 100 wt %, from about 80 wt % to 100 wt % polymer particles, from about 90 wt % to 100 wt % polymer particles, from about 95 wt % to 100 wt % polymer particles, or from about 60 wt % to about 99 wt % polymer particles. In some examples, the polymer powder can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from about 40 μm to about 80 μm.

The polymer powder can have a melting or softening point from about 70° C. to about 350° C. In further examples, the polymer can have a melting or softening point from about 150° C. to about 200° C. A variety of polymer particles with melting points or softening points in these ranges can be used, including thermoplastic polymer particles. For example, the polymer powder can include polyamide 6 powder, polyamide 9 powder, polyamide 11 powder, polyamide 12 powder, polyamide 6/6 powder, polyamide 6/12 powder, polyethylene powder, wax, thermoplastic polyamide, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or a mixture thereof. In a specific example, the polymer powder can be polyamide 12, which can have a melting point from about 175° C. to about 200° C. In another specific example, the polymer powder can be thermoplastic polyurethane.

The polymer particles can also, in some cases, be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, if other components are present such as a filler, a weight ratio of polymer particles to filler particles can be from about 100:1 to about 1:2 or from about 5:1 to about 1:1.

Three-Dimensional Printing Methods

Figure 3A:
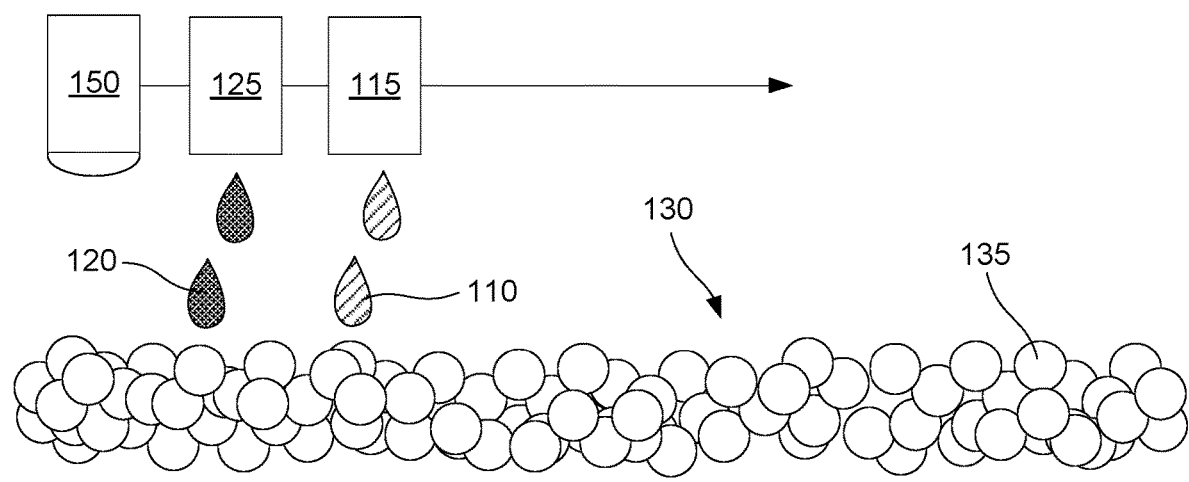
FIGS. 3A-3C show a schematic view of an example three-dimensional printing process using an example three-dimensional printing kit in accordance with examples of the present disclosure.

In particular, FIGS. 3A to 3C and FIG. 4 illustrate methods of printing or forming three-dimensional objects in accordance with the present disclosure. In FIG. 3A, for example, a fusing agent 110 is shown in the form of an ejected droplet from a fusing agent ejector 115, a tinted anti-coalescing agent 120 shown in the form of an ejected droplet from a tinted anti-coalescing agent ejector 125, and a powder bed material 130, which includes polymer particles 135, is also shown. Thus, in an example, the fusing agent and the tinted anti-coalescing agent can be ejected or jetted onto the powder bed, which includes a layer of the powder bed material, e.g., polymer particles and in some instances other particles may be present, where the fusing agent promotes fusing of the polymer particles together (inter-particulate and layer to layer), and the tinted anti-coalescing agent provides thermal insulation and/or cooling properties when ejected at or near a border region of the part that is being formed through the three-dimensional printing process. The tinted anti-coalescing agent also colors the polymer particles in the border region as explained above. The fluid ejectors can move across the layer of powder bed material to selectively jet fusing agent on areas that are to be fused, while the tinted anti-coalescing agent can be jetted onto areas that are to be cooled. A radiation source 150 can also move across the layer of powder bed material.

In some cases, the powder bed can be preheated to a preheat temperature within about 10° C. to about 70° C. of the fusing temperature of the polymer powder. Depending on the type of polymer powder used, the preheat temperature can be in the range of about 90° C. to about 250° C., or about 90° C. to about 200° C., for example. The tinted anti-coalescing agent can include a solvent that evaporates when it comes into contact with the powder bed at the preheat temperature, thereby cooling the printed portion of the powder bed through evaporative cooling.

The amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are about 100 microns thick, then the fusing agent can penetrate about 100 microns into the polymer powder. Thus, the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

As described above, the tinted anti-coalescing agent can include a fluid that reduces a temperature of the polymer powder on which the tinted anti-coalescing agent is printed. In particular, a maximum temperature reached by the powder during exposure to electromagnetic energy can be less in the areas where the tinted anti-coalescing agent is applied. The cooling effect may be due to the superabsorbent or water-retention properties of the polyelectrolyte materials described herein. For example, as the polyelectrolytes in the tinted anti-coalescing agent have the ability to hold or retain water or other evaporative liquids, e.g., from 2 to 1,000 times the weight of the polyelectrolyte compound included in the tinted anti-coalescing agent, there may be higher levels of evaporative cooling than with the same solvents added for evaporative cooling, but which are not held in place by the polyelectrolytes of the present disclosure. To provide one specific example, the superabsorbent nature of poly(acrylic acid sodium salt) or PNaA, can provide for higher water or liquid vehicle concentration to be held where applied for cooling, leading to more efficient cooling, and can provide a greater insulating barrier to combat the effects of thermal bleed that may otherwise occur when using evaporative solvents or water without this superabsorbent material within the tinted anti-coalescing agent.

In some examples, the tinted anti-coalescing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the powder bed material), the tinted anti-coalescing agent can be applied to these areas. Thus, the tinted anti-coalescing agent can be applied at areas where there is a border region positioned laterally between the printed object and the unprinted powder bed material, and can also be printed anywhere where the printed object may benefit from a cooling effect provided by the tinted anti-coalescing agent and the polyelectrolytes carried therein.

Figure 3B:
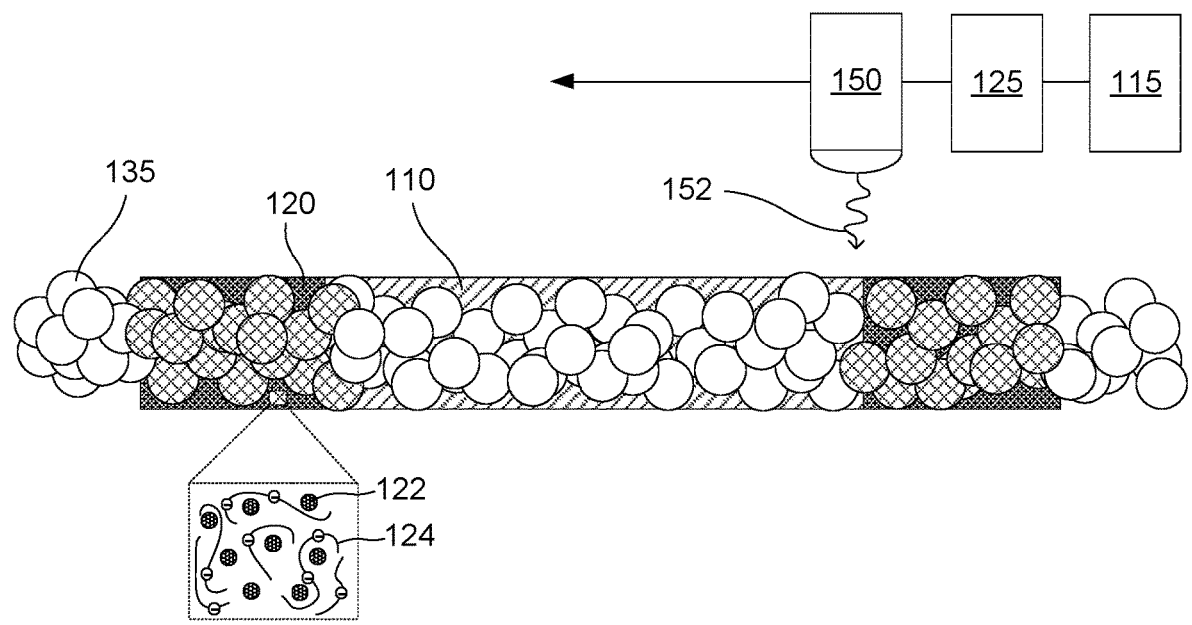

FIG. 3B shows the layer of powder bed material 130 after the fusing agent 110 and the tinted anti-coalescing agent 120 have been jetted onto respective areas of the powder bed to be fused and/or to provide thermal insulation or cooling at or around the object that is being printed on a layer by layer basis. Tinted anti-coalescing agent is shown in greater detail with aqueous liquid vehicle 122 (water or water-containing vehicle) as being held in place by a plurality of polyelectrolytes 124. The colored dye can be dissolved in the aqueous liquid vehicle. The polyelectrolytes shown are anionic linear polyelectrolytes in this example. The fusing agent is jetted where the object is to be fused, and the tinted anti-coalescing agent is jetted onto areas adjacent to the edges of the area to be fused. In this figure, the radiation source 150 is shown emitting radiation 152 toward a layer of powder build material, which is shown as part of a powder bed. The powder bed in this FIG. is not shown in full, but the layer of powder bed material is shows a portion, e.g., one of the layers, of the powder bed.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 seconds to about 10 seconds per pass.

Figure 3C:
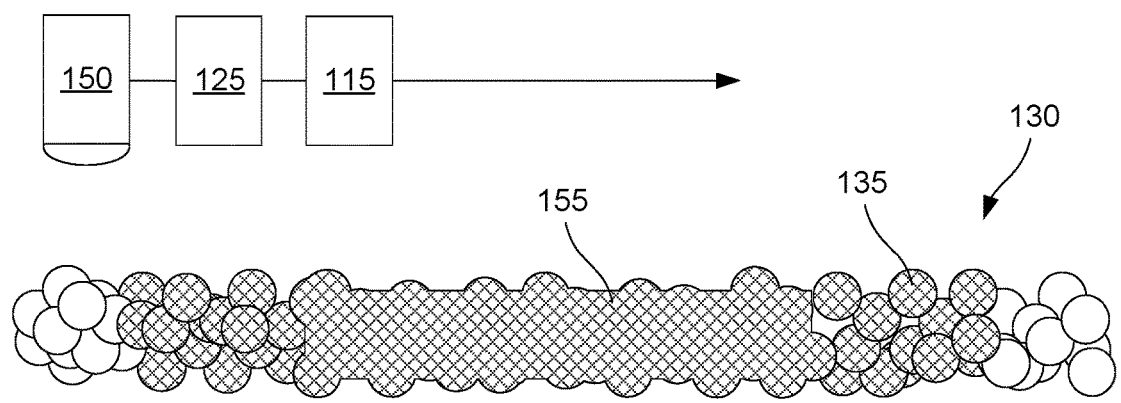

FIG. 3C shows the layer of powder bed material 130 with a fused portion 155 where the fusing agent was jetted and the radiation (152 of FIG. 3B) has interacted with the fusing agent to cause the polymer particles 135 of the powder bed material to fuse. In this example, a combination of the presence of the radiation absorber and the radiation together raise the temperature to cause the polymer particles to fuse and form the object. The area where the tinted anti-coalescing agent was jetted remains as loose polymer particles, due in part to the cooling effect of the tinted anti-coalescing agent with the polyelectrolyte present therein. As shown by the shading in this figure, the polymer particles where the tinted anti-coalescing agent was printed are colored the same color as the fused portion. Therefore, even if some of these adjacent particles are caked onto the fused portion or partially fused onto the fused portion, the surface color of the final three-dimensional printed objet will be uniform.

Figure 4:
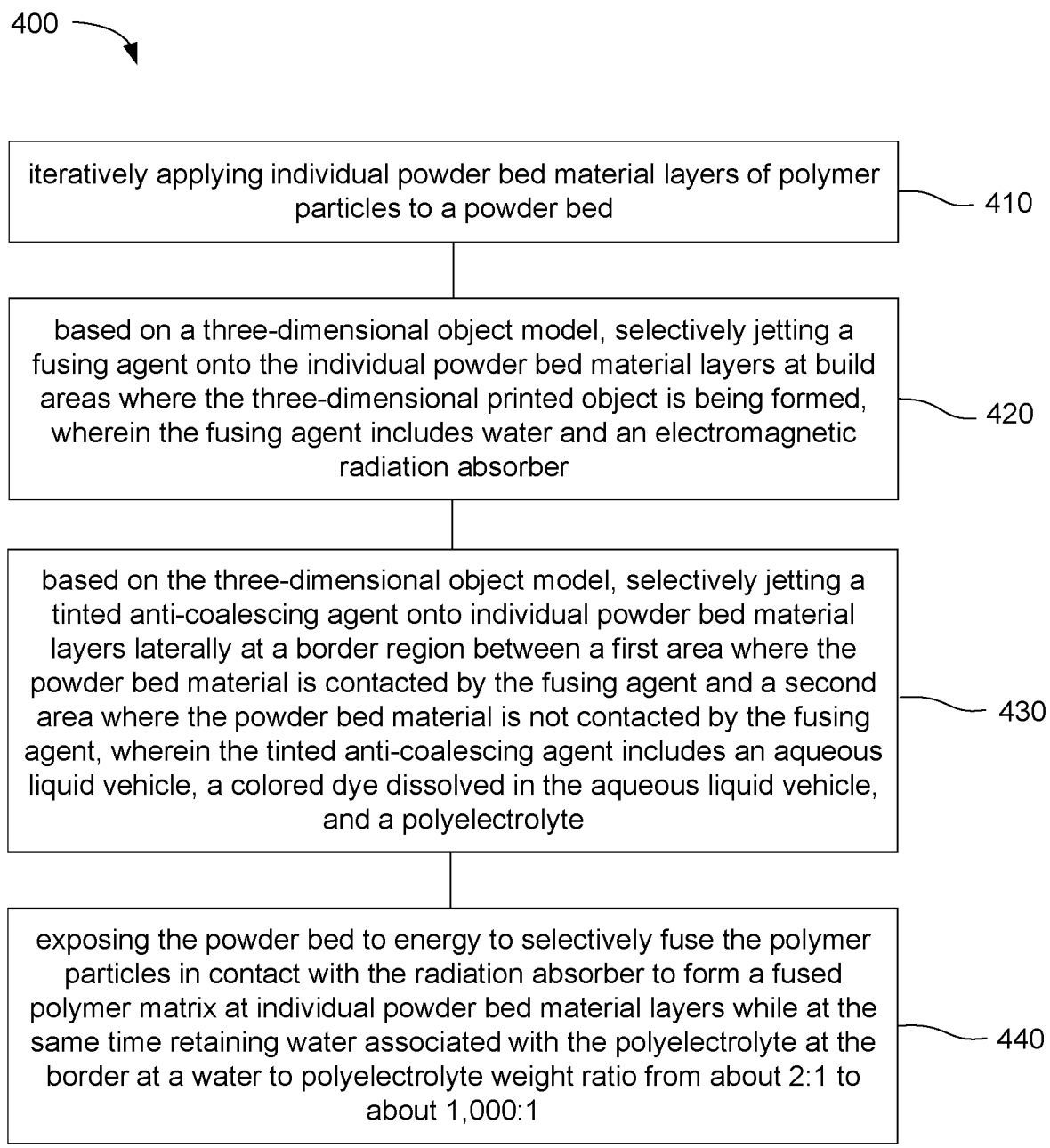
FIG. 4 is a flowchart illustrating an example method of making a three-dimensional printed object in accordance with examples of the present disclosure.

In further detail, this printing technology can be implemented in accordance with a method 400 of three-dimensional printing shown in FIG. 4. By way of example, the method can include iteratively applying 410 individual powder bed material layers of polymer particles to a powder bed, and based on a 3D object model, selectively jetting 420 a fusing agent onto the individual powder bed material layers at build areas where the three-dimensional printed object is being formed, wherein the fusing agent includes water and an electromagnetic radiation absorber 420. In further detail, the method can include, based on the 3D object model, selectively jetting 430 a tinted anti-coalescing agent onto individual powder bed material layers laterally at a border region between a first area where the powder bed material is contacted by the fusing agent and a second area where the powder bed material is not contacted by the fusing agent, wherein the tinted anti-coalescing agent includes an aqueous liquid vehicle, a colored dye dissolved in the aqueous liquid vehicle, and a polyelectrolyte. The method can further include exposing 440 the powder bed to energy to selectively fuse the polymer particles in contact with the radiation absorber to form a fused polymer matrix at individual powder bed material layers while at the same time retaining water associated with the polyelectrolyte at the border at a water to polyelectrolyte weight ratio from about 2:1 to about 1,000:1. In a more detailed aspect, the polyelectrolyte can in fact absorb and retain water at this weight ratio by absorbing the water to within the weight ratio range from about 2:1 to about 1,000:1, e.g., the polyelectrolyte can be considered to be super-absorbent.

In one example, the polyelectrolyte can be an anionic linear or branched polyelectrolyte having a weight average molecular weight from about 1,000 Mw to about 12,000 Mw and can be water-absorbent at a water to polyelectrolyte weight ratio from about 2:1 to about 1,000:1. The polyelectrolyte can include poly(acrylic acid sodium salt), poly(acrylic acid potassium salt), poly(acrylic acid lithium salt, poly(acrylic acid ammonium salt), or a combination thereof, for example. The method can also further include selectively applying the tinted anti-coalescing agent to build areas to control a temperature of a layer or layers of the three-dimensional printed object while being formed. As described above, the tinted anti-coalescing agent can also include a colored dye. In certain examples, the colored dye can be a black dye and the black dye can be included in an amount from about 0.1 wt % to about 3 wt % with respect to the total weight of the tinted anti-coalescing agent.

The three-dimensional printed object can be formed by applying, e.g., jetting, ejecting, etc., a fusing agent onto layers of powder bed material according to a 3D object model. Three-dimensional object models can in some examples be created using computer aided design (CAD) software. Three-dimensional object models can be stored in any suitable file format. In some examples, a three-dimensional printed object as described herein can be based on a single 3D object model. The 3D object model can define the three-dimensional shape of the object. Other information may also be included, such as structures to be formed of additional different materials or color data for printing the object with various colors at different locations on the object. The 3D object model may also include features or materials specifically related to application fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, concentration of the polyelectrolytes applied for cooling, and so on. All this information can be contained in a single three-dimensional object file or a combination of multiple files. The three-dimensional printed object can be made based on the 3D object model. In certain examples, software can be used to convert a 3D object model to instructions for a three-dimensional printer to form the object by building up individual layers of powder bed material.

Definitions

It is noted that, as used in this specification and the appended claims, the singular forms "a," "an," and "the" include plural referents unless the context clearly dictates otherwise.

As used herein, "ink jetting" or "jetting" or "ejecting" refers to one specific type of application of fluids on to powder bed material using inkjet or other fluidic ejection architecture. Ink-jet architecture can include thermal or piezo architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are identified as separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value.

Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and fluid agents, materials kits, compositions, and/or methods may be devised without departing from the spirit and scope of the present disclosure. The appended claims are intended to cover such modifications and arrangements.

Example 1—Preparation of Tinted Anti-Coalescing Agent

A tinted anti-coalescing agent formulation and a control detailing agent for comparison were prepared in accordance with Table 1, as follows:

TABLE 1

Tinted anti-coalescing agent (TACA) formulation and control detailing agent (DA) formulation

| Ingredient | TACA (wt %) | Control DA (wt %) |
|---|---|---|
| Organic Co-solvent | 4 | 4 |
| Poly(acrylic acid sodium salt) Polyelectrolyte* | 10 | 0 |
| Surfactant, Anti-kogation Compound, Chelator, Biocide, and Buffer | 1.79 | 1.79 |
| Black Dye | 1 | 0 |
| Water | Balance | Balance |

*Poly(acrylic acid sodium salt) at 1,200 Mw

Example 2—Performance of Tinted Anti-Coalescing Agent with Polyelectrolyte

A Tinted anti-coalescing agent prepared in accordance with Table 1 was prepared with 10 wt % poly(acrylic acid sodium salt) and 1 wt % black dye. The poly(acrylic acid sodium was an anionic polymer having a weight average molecular weight of 1,200 Mw.

Computer 3D object models were used to prepare an object referred to as a "gap checker" designed to evaluate the effectiveness of the tinted anti-coalescing agent. The gap checker was designed to print a horizontal substrate or base with several pairs of vertical tiles (square) extending upward therefrom. The object was designed so that the pairs of vertical tiles had a gap therebetween (major surface facing major surface separated by the gap) ranging in distance between tiles of a pair from 0.1 mm to 0.5 mm. Tinted anti-coalescing agent was deposited between the two plates of the various pairs during the build process. For the evaluation, the tinted anti-coalescing agent with the polyelectrolyte was prepared in accordance with Table 1. For comparison, a detailing agent that that excluded the polyelectrolyte (Control DA) was used. Then design of the "gap checker" object was such that if there was adequate separation between the individual pairs of plates, one of the plates could be remove or separated from the other by breaking one of the plates away from the other while keeping the other plate undamaged as attached to the horizontal substrate or base. To achieve this, one of the two vertical plates of the various pairs was not printed to be connected to the horizontal substrate, e.g., it was connected to the other vertical plate with tinted anti-coalescing agent and powder build material therebetween. Thus, the more tiles that can be separated from their opposing tile of the pair, the better the gap clearance. For example, for a pair of tiles that can be separated down to 0.2 mm, then that would be better performance for the tinted anti-coalescing agent than if the pairs of tiles could be separated at gaps no smaller than 0.3 mm. To account for variability, the parts were printed twice in both a default orientation and a 180° rotated orientation to account for potential temperature non-uniformity in the powder bed material as related to the three-dimensional printing apparatus. The tile pairs printed with the TACA therebetween was able to provide acceptable gap clearance down to 0.2 mm, failing at 0.1 mm. The tile pairs printed with the control DA therebetween was able to provide acceptable gap clearance down to 0.3 mm, failing at 0.2 mm and 0.1 mm. On the other hand, the gap surface had a more uniform black color when the TACA was used compared to the control DA. A second test was performed with the three-dimensional printed objects turned 180° in the powder bed to control for possible temperature variations in different areas of the powder bed. The gap clearance results of the second test were the same.

The powder bed material used for this example was 100 wt % polyamide-12 powder, and the fusing agent used was a black fusing agent that includes a black pigment as the radiation absorber. The TACA and DA formulations used are shown in Table 1. Other than the selection of tinted anti-coalescing agent vs. detailing agent, the printing parameters were identical.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A multi-fluid kit for three-dimensional printing, the multi-fluid kit comprising:
    a fusing agent comprising water and an electromagnetic radiation absorber, wherein the electromagnetic radiation absorber absorbs radiation energy and converts the radiation energy to heat; and
    a tinted anti-coalescing agent contained separately from the fusing agent, the tinted anti-coalescing agent comprising:
        an aqueous liquid vehicle;
        a colored dye dissolved in the aqueous liquid vehicle; and
        a polyelectrolyte having a weight average molecular weight from about 1,000 Mw to about 8,000 Mw, wherein the polyelectrolyte is water-absorbent at a water to polyelectrolyte weight ratio from about 2:1 to about 1,000:1, and wherein about 90 wt % to 100 wt % of the polyelectrolyte is dissolved in the aqueous liquid vehicle.

2. The multi-fluid kit of claim 1, wherein the polyelectrolyte is present in an amount ranging from about 1 wt % to about 12 wt % with respect to a total weight of the tinted anti-coalescing agent.

3. The multi-fluid kit of claim 1, wherein the polyelectrolyte is an anionic linear or branched polyelectrolyte.

4. The multi-fluid kit of claim 1, wherein the polyelectrolyte is selected from the group consisting of poly (acrylic acid sodium salt), poly (acrylic acid potassium salt), poly (acrylic acid lithium salt, poly (acrylic acid ammonium salt), and a combination thereof.

5. The multi-fluid kit of claim 1, wherein the polyelectrolyte is a strong polyelectrolyte that is fully dissociated in the aqueous liquid vehicle.

6. The multi-fluid kit of claim 1, wherein the colored dye is a black dye.

7. The multi-fluid kit of claim 1, wherein the colored dye is present in an amount ranging from about 0.1 wt % to about 3 wt % with respect to a total weight of the tinted anti-coalescing agent.

8. A three-dimensional printing kit, comprising:
    a powder bed material comprising polymer particles;

a fusing agent comprising water and an electromagnetic radiation absorber, wherein the electromagnetic radiation absorber absorbs radiation energy and converts the radiation energy to heat; and a tinted anti-coalescing agent contained separately from the fusing agent, the tinted anti-coalescing agent comprising:
an aqueous liquid vehicle;
a colored dye dissolved in the aqueous liquid vehicle; and
a polyelectrolyte having a weight average molecular weight from about 1,000 Mw to about 8,000 Mw, wherein the polyelectrolyte is water-absorbent at a water to polyelectrolyte weight ratio from about 2:1 to about 1,000:1, and wherein about 90 wt % to 100 wt % of the polyelectrolyte is dissolved in the aqueous liquid vehicle.

9. The three-dimensional printing kit of claim 8, wherein the polymer particles are selected from the group consisting of polyamide 6 particles, polyamide 9 particles, polyamide 11 particles, polyamide 12 particles, polyamide 6/6 particles, polyamide 6/12 particles, polyethylene particles, thermoplastic polyurethane particles, polypropylene particles, polyester particles, polycarbonate particles, polyether ketone particles, polyacrylate particles, polystyrene powder, wax particles, and a combination thereof.

10. The three-dimensional printing kit of claim 8, wherein the polyelectrolyte is present in an amount ranging from about 1 wt % to about 12 wt % with respect to a total weight of the tinted anti-coalescing agent.

11. The three-dimensional printing kit of claim 8, wherein the colored dye is a black dye, and wherein the black dye is present in an amount ranging from about 0.1 wt % to about 3 wt % with respect to a total weight of the tinted anti-coalescing agent.

12. A method of making a three-dimensional printed object, the method comprising:
iteratively applying individual powder bed material layers of polymer particles to a powder bed;
based on a 3D object model, selectively jetting a fusing agent onto the individual powder bed material layers at build areas where the three-dimensional printed object is being formed, wherein the fusing agent comprises water and an electromagnetic radiation absorber;
based on the 3D object model, selectively jetting a tinted anti-coalescing agent separately from the fusing agent onto individual powder bed material layers laterally at a border region between a first area where the powder bed material is contacted by the fusing agent and a second area where the powder bed material is not contacted by the fusing agent, wherein the tinted anti-coalescing agent comprises an aqueous liquid vehicle, a colored dye dissolved in the aqueous liquid vehicle, and a polyelectrolyte having a weight average molecular weight from about 1,000 Mw to about 8,000 Mw, wherein the polyelectrolyte is water-absorbent at a water to polyelectrolyte weight ratio from about 2:1 to about 1,000:1 and about 90 wt % to 100 wt % of the polyelectrolyte is dissolved in the aqueous liquid vehicle; and
exposing the powder bed to energy to selectively fuse the polymer particles in contact with the radiation absorber to form a fused polymer matrix at individual powder bed material layers while at the same time retaining water associated with the polyelectrolyte at the border region at the water to polyelectrolyte weight ratio ranging of from about 2:1 to about 1,000:1.

13. The method of claim 12, wherein the polyelectrolyte is an anionic linear or branched polyelectrolyte having a weight average molecular weight from about 1,000 Mw to about 8,000 Mw and the polyelectrolyte is water-absorbent to retain water within the water to polyelectrolyte weight ratio.

14. The method of claim 12, wherein the polyelectrolyte is selected from the group consisting of poly (acrylic acid sodium salt), poly (acrylic acid potassium salt), poly (acrylic acid lithium salt, poly (acrylic acid ammonium salt), and a combination thereof.

15. The method of claim 12, wherein the colored dye is a black dye, and wherein the black dye is present in an amount ranging from about 0.1 wt % to about 3 wt % with respect to a total weight of the tinted anti-coalescing agent.

16. The multi-fluid kit of claim 1, wherein the electromagnetic radiation absorber is a carbon black pigment.

* * * * *